UNITED STATES PATENT OFFICE.

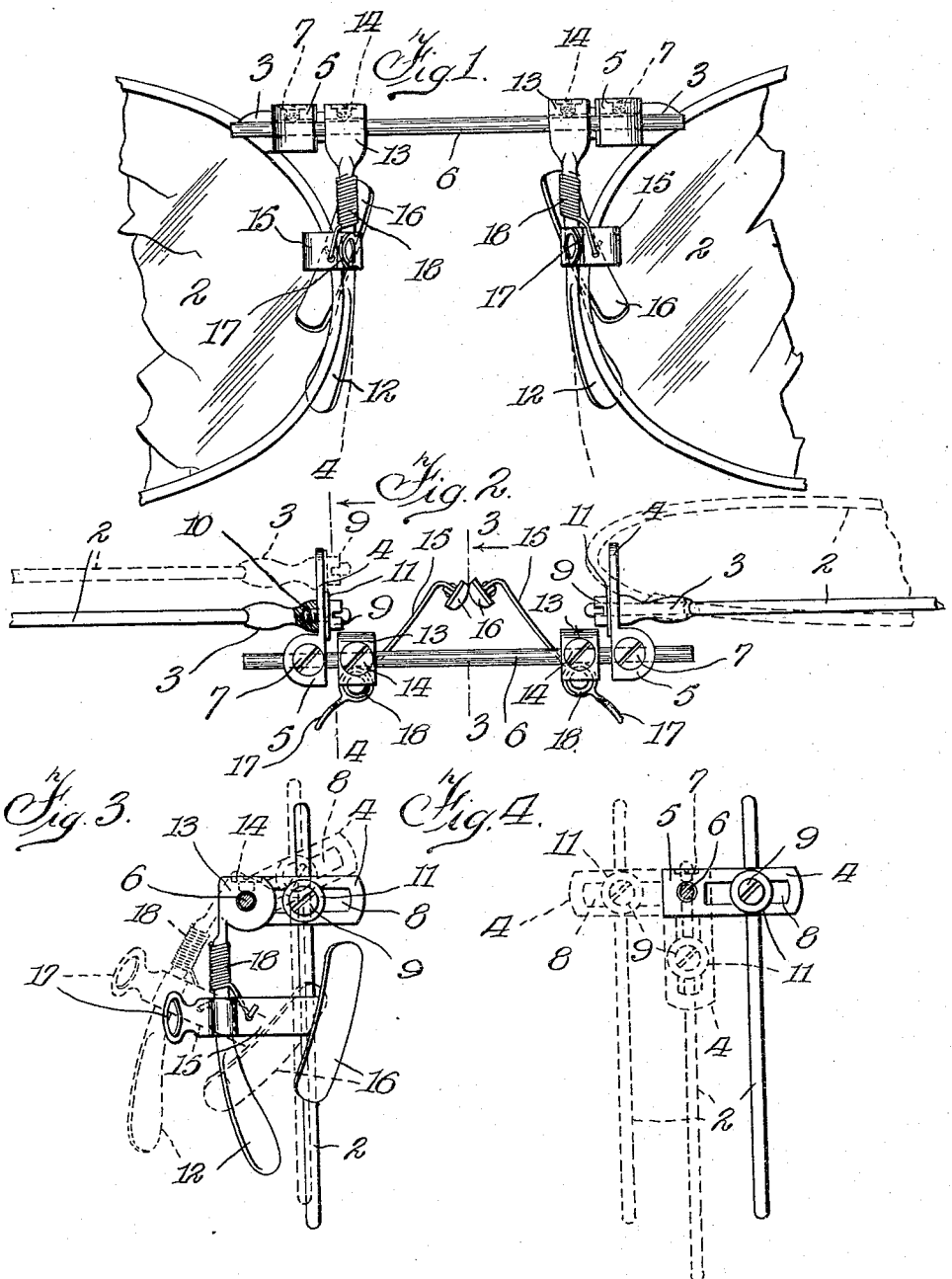

ZOËL MARCEL LÉGER, OF MONCTON, NEW BRUNSWICK, CANADA.

EYEGLASSES AND SPECTACLES.

1,171,795.  Specification of Letters Patent.  Patented Feb. 15, 1916.

Application filed May 10, 1915. Serial No. 27,198.

*To all whom it may concern:*

Be it known that I, ZOËL MARCEL LÉGER, a subject of the King of Great Britain, and residing at 58 King street, Moncton, Province of New Brunswick, Canada, have invented certain new and useful Improvements in Eyeglasses and Spectacles, and do hereby declare that the following is a full, clear, and exact description of same.

This invention relates to eye-glasses and spectacles either with rims or rimless and appertains particularly to the mountings of such eye-glasses and spectacles.

Heretofore the lenses of eye-glasses and spectacles have been stationary with respect to their mounting and consequently presented difficulties in their proper adjustment to meet individual requirements and also for this reason necessitated special manufacture in some instances and an object of this invention is to overcome this disadvantage by providing eye-glasses or spectacles with lenses so mounted that their position can be adjusted with relation to each other and also with relation to their mountings. Furthermore when, as in eye-glasses, spring controlled clips are solely relied upon to secure the lenses to the nose of the wearer it is necessary in most cases to so tension the springs that the clips press tightly upon and chafe the nose and it is another object to provide means for securing eye-glasses upon the nose without spring clips or to act in conjunction with such clips, in the latter case the necessary tension of the springs being such as to avoid chafing of the nose.

The above with further objects and advantages will be hereinafter more fully described and particularly pointed out in the appended claims. For full comprehension, however, of my invention reference should be had to the accompanying drawings forming a part of this specification, in which similar reference characters indicate the same parts wherein:

Figure 1 is a front view of my improved eye-glass; Fig. 2 is a plan thereof; Fig. 3 is a section on line 3—3 Fig. 2; and Fig. 4 is a section on line 4—4 Fig. 2.

Referring now to these drawings, 2 indicates the lenses and 3 the studs by means of which they are attached to the mounting and which are secured to the rim of rimmed lenses as shown in the drawing or formed as clasps for their attachment to rimless lenses.

The stud 3 of each lens is attached to an arm 4 formed with a sleeve 5 at one end and having one end of a bar 6, constituting the bridge of the mounting, passed therethrough, the sleeves being adjustably secured upon the bar preferably by set-screws 7 which pass through holes in the sleeve and are pointed at their ends to bite into the bar. The heads of the screws are countersunk.

Each of the arms 4 extends outwardly from the bridge and has a longitudinal slot 8 therein, the stud 3 carried by the arm being secured thereto by means of a screw 9. The shank of the screw is passed outwardly through the slot and screws into a tapped hole 10 formed in the stud, the end of which latter crosses the slot and abuts against the outer surface of the arm so that by screwing the screw into the stud the latter and the head of the former are drawn together and tightly against opposite surfaces of the arm. If desired a washer 11 may be placed upon the screw between its head and the inner surface of the arm.

The bridge bar 6 is preferably rounded or has rounded portions and from the above it will be readily seen that by loosening either of the set-screws 7, the arm through which it passes can be swung to any desired position about the bar as shown in dotted lines Fig. 3, moved to vary the inclination and elevation of the lens relatively to the bridge or to each other or such arm can be shifted along the bar to change the relative position of or distance between the lenses. The inclination of either of the lenses can be changed independently of and with respect to their carrying arms 3 and the bridge by loosening the screw 9 and so permitting it to rotate in the slot with the stud of the lens as the inclination of the latter is changed as indicated by dotted lines at the right of Fig. 2 and the slots 8 enable the lenses to be individually shifted longitudinally of their carrying arms and away from or closer to the bridge as shown at the left of Fig. 2. Furthermore the loosening of set-screws 7 enables the carrying arms 3 to be swung from their normal position, extending inwardly from the bridge, to an outwardly extending position with relation to the latter in the event of the necessity of positioning the lenses far out from the bridge bar and the eyes of the wearer and the loosening of screws 9 provides the necessary loose connection to enable the arms, in swinging outwardly, to also swing around the screws, the swinging movement of the arms being thus compensated for and the shifting of the lenses from the inner to the outer side of the bridge bar without reversing such lenses.

To secure the eye-glasses to a wearer's nose I provide a pair of fingers 12 which are located between the arms 3 and extend downwardly from the bridge bar, having sleeves 13 at their upper ends which are mounted upon the bar and adjustably secured thereto by countersunk set-screws 14. The fingers are preferably flattened at their lower ends and are bendable and, by loosening screws 14, capable of being swung about the bridge or shifted along same to vary their relative position and the space between them so that they can be accurately adjusted to fit snugly against opposite sides of the nose and by the weight of the eye-glasses to lightly wedge upon the same, thus holding the eye-glasses upon the nose. From Fig. 1 it will be seen that the bridge bar is so placed that the fingers 12 can be spaced apart a distance equal to that between the adjacent edges of the lenses and so provide for the accommodation of the maximum width of nose to which the eye-glasses can be properly adjusted.

To augment the fingers in holding the eye-glasses upon the nose and especially to prevent them falling when the head is bent forward I provide a finger-piece clasp of usual construction which is carried by the fingers and consists of a pair of arms 15 each of which is fulcrumed between its ends upon one of the fingers 12 and having an extended nose engaging extension or clip 16 at its inner end and a finger piece 17 at its outer end. The arms 15 with extensions 16 are yieldingly drawn together by springs 18 coiled about fingers 12 and attached at opposite ends to the latter and to the arms 15. While this finger-piece clasp engages the nose under the influence of springs it will be obvious that the tension of the latter need not be so great as when such clasp is solely relied upon to hold the eye-glasses upon the nose and that therefore chafing of the nose as a result of such spring pressure is avoided.

What I claim is as follows:

1. In eye-glasses and the like, the combination with a bridge bar, of an arm pivoted to the bar and a lens pivoted to the arm.

2. In eye glasses and the like, the combination with a bridge bar, of an arm pivoted to and adjustable longitudinally of the bar and a lens pivoted to and adjustable longitudinally of the arm.

3. In eye-glasses and the like, the combination with a bridge bar, of a longitudinally slotted arm, a sleeve upon the arm and loosely carried by the bar, means for adjustably securing the sleeve to the bar, a lens and means located in the slot of the arm for adjustably securing the lens to said arm.

4. In eye-glasses and the like a pair of lenses, studs secured to said lenses and having tapped holes therein, longitudinally slotted arms, screws passed through the slots in the arms and into said tapped holes, sleeves formed upon the arms, a bridge bar passed through the sleeves, set-screws securing the sleeves to the bar, a pair of fingers, sleeves formed upon the fingers located between the first mentioned sleeves and having said bar passed therethrough and set-screws securing the last mentioned sleeves to the bar.

5. In eye-glasses and the like, a pair of lenses, studs secured to said lenses and having tapped holes therein, longitudinally slotted arms, screws passed through the slots in the arms and into said tapped holes, sleeves formed upon the arms, a bridge bar passed through the sleeves, set-screws securing the sleeves to the bar, a pair of fingers, sleeves formed upon the fingers, located between the first mentioned sleeves and having said bar passed therethrough and set-screws securing the last mentioned sleeves to the bar, arms, one of which is fulcrumed between its ends upon one of said fingers, nose clips at one of the ends of said fulcrumed arms, finger pieces at the opposite ends of the fulcrumed arms and springs coiled about said fingers and attached at their ends respectively to the fingers and said fulcrumed arms.

In testimony whereof I have signed my name to this specification, in the presence of two subscribing witnesses.

ZOËL MARCEL LÉGER.

Witnesses:
STANLEY C. KING,
JAMES C. FRASER.

Copies of this patent may be obtained for five cents each, by addressing the "Commissioner of Patents, Washington, D. C."